United States Patent [19]

Marshall

[11] Patent Number: 4,617,236

[45] Date of Patent: Oct. 14, 1986

[54] ADDITIVES TO POLYESTER TIRE YARN OVERFINISH TO REDUCE DIP PENETRATION

[75] Inventor: Robert M. Marshall, Chester, Va.

[73] Assignee: Allied Corporation, Morris Township, Morris County, N.J.

[21] Appl. No.: 789,879

[22] Filed: Oct. 21, 1985

[51] Int. Cl.$^4$ .................... B32B 25/00; D06M 13/52
[52] U.S. Cl. .................... 428/391; 428/375; 428/378; 428/392; 428/395; 252/8.6; 252/8.75; 252/8.9
[58] Field of Search ............... 428/375, 378, 391, 392, 428/395; 252/8.6, 8.75, 8.9

[56] References Cited

U.S. PATENT DOCUMENTS

| | | | |
|---|---|---|---|
| 3,672,977 | 6/1972 | Dardoufas | 252/8.75 |
| 3,681,244 | 8/1972 | Obetz et al. | 428/395 |
| 3,687,721 | 8/1972 | Dardoufas | 117/138.8 |
| 3,730,892 | 5/1973 | Marshall et al. | 252/8.75 |
| 3,853,607 | 12/1974 | Iyengar et al. | 428/391 |
| 4,103,068 | 7/1978 | Marshall et al. | 428/395 |
| 4,105,568 | 8/1978 | Marshall et al. | 428/395 |
| 4,374,031 | 2/1983 | Kudo et al. | 252/8.8 |
| 4,381,640 | 5/1983 | Chakravarti et al. | 428/391 |
| 4,382,993 | 5/1983 | McIntyre et al. | 252/8.9 |
| 4,397,985 | 8/1983 | Marshall et al. | 252/8.9 |

Primary Examiner—George F. Lesmes
Assistant Examiner—S. A. Gibson
Attorney, Agent, or Firm—William H. Thrower

[57] ABSTRACT

Polyester yarn for tire cord having incorporated thereon a finish composition comprising an aqueous emulsion of a lubricant selected from the group consisting of hexadecyl stearate, butyl stearate, natural or modified glycerides, and mineral oil; glycerol monooleate; decaglycerol tetraoleate; polyoxyethylene tall oil fatty acid; sulfonated glycerol trioleate; polyoxyethylene tallow amine; 0–30 parts by weight of the nonaqueous portion of the emulsion of a silane having the structural formula

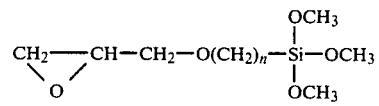

wherein n=2 to 5; and paraffin wax in an amount sufficient to impart improved anti-wicking properties to the tire cord provides an improved tire cord with an improved controlled level of RFL dip pick-up.

17 Claims, No Drawings

ADDITIVES TO POLYESTER TIRE YARN OVERFINISH TO REDUCE DIP PENETRATION

BACKGROUND OF THE INVENTION

This invention relates to improved multifilament polyester yarns for industrial uses. More particularly, it relates to a fiber finish composition specifically for polyethylene terephthalate yarns to be processed into tire cord for use as reinforcement in tires.

U.S. Pat. No. 3,687,721 to Dardoufas discloses an improved polyester tire yarn treated with a spin finish composition comprising hexadecyl stearate, glycerol monooleate, decaglycerol tetraoleate, ethoxylated tall oil fatty acid, sulfonated glycerol trioleate, and an ethoxylated alkylamine.

U.S. Pat. No. 3,730,892 to Marshall et al. discloses polyester tire yarn treated with an overfinish composition additionally comprising a silane having the structural formula

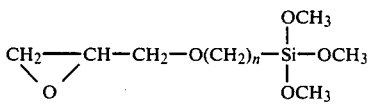

wherein n=2 to 5. The composition is applied after the draw zone. The treated yarn can be subsequently processed into the cord with only a single dip treatment required to obtain the fiber to rubber adhesion necessary to use in tires.

While the polyester tire yarns disclosed above are successful commercial products, further improvements are desirable. When processed into tire cord and treated with resorcinol-formaldehyde-latex (RFL) dips, the tire cord may pick up too much of the RFL dip that subsequently flakes off the fiber in the treating oven, creating a housekeeping problem and a fire hazard. When the RFL treated tire cord is incorporated into the construction of a tire and the composite structure cured, it is essential to allow any entrained air in the composite tire to be transmitted out of a tire during curing. If, during dip treating, the tire cord picks up too much RFL dip that saturates the interstices of the tire cord, a pathway for entrained air may be blocked, thus increasing the probability of post-cure blows.

SUMMARY OF THE INVENTION

Polyester yarn for tire cord having incorporated thereon a finish composition comprising an aqueous emulsion of a lubricant selected from the group consisting of hexadecyl stearate, butyl stearate, natural or modified glycerides, and mineral oil; glycerol monooleate; decaglycerol tetraoleate; polyoxyethylene tall oil fatty acid; sulfonated glycerol trioleate; polyoxyethylene tallow amine; 0-30 parts by weight of the nonaqueous portion of the emulsion of a silane having the structural formula

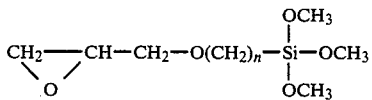

wherein n=2 to 5; and paraffin wax in an amount sufficient to impart improved anti-wicking properties to the tire cord provides an improved tire cord with an improved controlled level of RFL dip pick-up.

DETAILED DESCRIPTION OF THE INVENTION

The fiber finish compositon of the invention is an aqueous emulsion, the non-aqueous portion of the emulsion comprising
(a) about 45 to 65 parts by weight of a lubricant selected from the group consisting of hexadecyl stearate, butyl stearate, natural or modified glycerides, and mineral oil;
(b) about 4 to 6 parts by weight of glycerol monooleate;
(c) about 3.5 to 5.5 parts by weight of decaglycerol tetraoleate;
(d) about 5.5 to 8.1 parts by weight of polyoxyethylene tall oil fatty acid containing 10-20 oxyethylene units per mole;
(e) about 8.0 to 12.0 parts by weight sulfonated glycerol trioleate;
(f) about 2.0 to 4.0 parts by weight polyoxyethylene tallow amine containing an average of 10-30 oxyethylene units per mole;
(g) 0 to 30 parts by weight of a silane having the structural formula

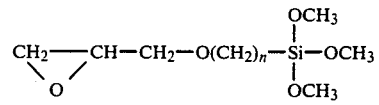

wherein n=2 to 5;
(h) about 3-15 weight percent, based on the non-aqueous portion, of paraffin wax.

The paraffin wax may be employed in the composition in amounts up to 15 weight percent of the nonaqueous portion of the emulsion, more preferably in amounts of from 4 to 10 weight percent, more preferably in amounts of from 6 to 10 weight percent. The paraffin wax may be either natural or synthetic. Preferred are refined paraffins (having an oil content of about 0.5 percent by weight, white in color, and free of odor) and/or semi-refined paraffins (having an oil content of 1.0 to 2.5 percent by weight, off-white in color and slight odor). Mixtures of paraffin waxes may also be employed. It is preferred that the paraffin waxes have a melting range of from about 30° C. to about 80° C., more preferably from about 40° C. to 60° C.

The aqueous emulsion is preferably applied to yarn as an overfinish after drawing has been completed in any of the conventional ways of applying yarn finishes. A satisfactory manner of applying the finish is by feeding the emulsion to a trough equipped with a rotatable roll dipping therein and passing the yarn in contact with this roll. The rate of rotation of the roll can be adjusted to provide desired pick-up of coating by the yarn.

The finish composition of the present invention provides substantial advantages over the prior art compositions when applied to polyester yarn for use as tire cord without interfering with fiber to rubber adhesion. It is known in the prior art to pretreat polyester fibers, then treat the tire cord by "dipping" in a resorcinol-formaldehyde-latex (RFL) adhesive system to obtain good fiber to rubber adhesion. See, for example, U.S. Pat. Nos. 3,687,721 and 3,730,892 cited above, and U.S. Pat. No. 4,374,031 to Kudo et al.

The composition of the present invention offers important improvements over U.S. Pat. No. 3,687,721 and U.S. Pat. No. 3,730,892 by improving control over the amount of RFL dip pick-up during treatment. If excess RFL dip picked up by the tire cord during treatment subsequently flakes off the fiber in the treating oven, a fire hazard as well as a housekeeping problem is created. Additionally, it is believed the present invention prevents the RFL dip from saturating the interstices of the tire cord, thus remaining primarily toward the outer surface of the tire cord. This provides important interstices through the interior of the cord, allowing entrained air to emerge during curing of the tire and preventing the problem of post-cure blows caused by trapped air.

EXAMPLE 1

A base formulation for finish composition was prepared with the following constituents:

|  | Wt. % |
| --- | --- |
| Hexadecyl stearate | 62.7 |
| Glycerol monooleate | 5.9 |
| decaglycerol tetraoleate | 8.0 |
| POE (15) tall oil fatty acid | 7.8 |
| Sulfonated glycerol trioleate | 11.8 |
| POE (20) tallow amine | 3.8 |

A base finish composition was prepared by combining 24.6 parts of the base formulation above, 70.0 parts $H_2O$, and 5.4 parts gamma-glycidoxypropyltrimethoxy silane.

Polyethylene terephthalate yarn samples were prepared by treating 1000 denier/192 filament spun-drawn yarn with the base finish composition (control) and with the base finish composition combined with the additives enumerated in Table I below. Total finish level was about 0.8% solids on the weight of the yarn.

The yarn samples were twisted into greige tire cord. The 1000/2 11.5×11.5 TPI cord was allowed to stand vertically in a RFL dip formulation composed of 20.8 weight percent vinyl pyridine latex, 2.24 weight percent resorcinol, 1.96 weight percent ammonium hydroxide, 1.16 weight percent formaldehyde, 0.061 weight percent sodium hydroxide, and 73.8 weight percent water. The length of wicking was measured versus a two minute time period. Results are presented in Table 1.

TABLE I

| Finish | RFL Wicking mm in 2 min. |
| --- | --- |
| Control | 18.0 |
| Control + 10 wt % of 50% paraffin wax emulsion (5.0% solids) | 3.4 |
| Control + 5 wt % of 50% paraffin wax emulsion (2.5% solids) | 4.0 |
| Control + 2.5% solids Repelotex D metal salt - paraffinic wax complex emulsion available from Lyndal Chemical Co. | 6.8 |
| Control + 2% solids Repelotex HM melamine wax available from Lyndal Chemical Co. | 14.2 |
| Control + 1.6% of 20% polyethylene emulsion | 17.0 |
| Control + 3.2% of 20% polyethylene emulsion | 18.0 |
| Control + 5% 100 cts silicone oil in oil base | 16.0 |
| Control + 0.6% solids Allied fluorochemical described in U.S. Pat. No. 4,192,754 | 13.0 |

TABLE I-continued

| Finish | RFL Wicking mm in 2 min. |
| --- | --- |
| Control + 1.2% solids Allied fluorochemical described in U.S. Pat. No. 4,192,754 | 10.5 |
| Control | 18.0 |
| Control + 1% solids Repellan 80 emulsified silicone compound available from Henkel Corp. | 12.9 |

From Table I, it is seen that the presence of the paraffin wax substantially decreases the level of RFL wicking.

EXAMPLE 2

Two tire cords are prepared from 1000 denier/192 filament polyethylene terephthalate yarn, tire cord A containing about 0.8% solids on the weight of the yarn of the control finish composition, tire cord B containing about 0.8% solids of the control finish composition +5 wt% of 50% paraffin wax emulsion, both finish compositions described above in Example 1. The two tire cords are dip-treated with RFL adhesive. Tire cord B picks up less of the RFL dip during treatment than the tire cord A. In subsequent oven treatment of the tire cords after dipping, there is no perceptible problem of RFL "dusting" with tire cord B. When the RFL treated tire cord is further processed into tires and cured there is no problem perceived with post-cure blows with tire cord B. Fiber to rubber adhesion of tire cords A and B are similar.

We claim:

1. In a finish composition for polyester continuous filament yarn to be processed into tire cord, said composition comprising an aqueous emulsion of a lubricant selected from the group consisting of hexadecyl stearate, butyl stearate, natural or modified glycerides, and mineral oil; glycerol monooleate; decaglycerol tetraoleate; polyoxyethylene tall oil fatty acid; sulfonated glycerol trioleate; polyoxyethylene tallow amine; and 0–30 parts by weight of the non-aqueous portion of the emulsion of a silane having the structural formula

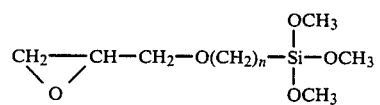

wherein n=2 to 5;

the improvement wherein said aqueous emulsion additionally comprises dispersed therein paraffin wax in an amount sufficient to impart reduced resorcinol-formaldehyde-latex wicking to said tire cord.

2. The finish composition of claim 1 wherein said paraffin wax is present in an amount of from 3 to 15 weight percent of the nonaqueous portion of the aqueous emulsion.

3. The finish composition of claim 2 wherein said paraffin wax is present in an amount of from 4 to 10 weight percent of the nonaqueous portion of the aqueous emulsion.

4. The finish composition of claim 3 wherein said paraffin wax is present in an amount of from 6 to 10 weight percent of the nonaqueous portion of the aqueous emulsion.

5. The finish composition of claim 2 wherein said lubricant is hexadecyl stearate.

6. The finish composition of claim 3 wherein said lubricant is hexadecyl stearate.

7. The finish composition of claim 4 wherein said lubricant is hexadecyl stearate.

8. Polyethylene terephthalate filamentary yarn for tire cord which is treated with the finish composition of claim 1 in an amount sufficient to impart reduced resorcinol-formaldehyde-latex wicking to said tire cord.

9. Polyethylene terephthalate filamentary yarn for tire cord which is treated with the finish composition of claim 2 in an amount sufficient to impart reduced resorcinol-formaldehyde-latex wicking to said tire cord.

10. Polyethylene terephthalate filamentary yarn for tire cord which is treated with the finish composition of claim 3 in an amount sufficient to impart reduced resorcinol-formaldehyde-latex wicking to said tire cord.

11. Polyethylene terephthalate filamentary yarn for tire cord which is treated with the finish composition of claim 4 in an amount sufficient to impart reduced resorcinol-formaldehyde-latex wicking to said tire cord.

12. Polyethylene terephthalate filamentary yarn for tire cord which is treated with the finish composition of claim 5 in an amount sufficient to impart reduced resorcinol-formaldehyde-latex wicking to said tire cord.

13. Polyethylene terephthalate filamentary yarn for tire cord which is treated with the finish composition of claim 6 in an amount sufficient to impart reduced resorcinol-formaldehyde-latex wicking to said tire cord.

14. Polyethylene terephthalate filamentary yarn for tire cord which is treated with the finish composition of claim 7 in an amount sufficient to impart reduced resorcinol-formaldehyde-latex wicking to said tire cord.

15. Polyethylene terephthalate filamentary yarn for tire cord which is treated with from bout 0.3 to about 1.5 weight percent solids based on the weight of the yarn of a finish composition comprising an aqueous emulsion, the non-aqueous portion of said emulsion comprising (a) 45 to 65 parts by weight hexadecyl stearate;
(b) 4 to 6 parts by eight glycerol monooleate;
(c) 3.5 to 5.5 parts by weight decaglycerol tetraoleate;
(d) 5.5 to 8.1 parts by weight polyoxethylene tall oil fatty acid containing 10-20 oxyethylene units per mole;
(e) 8.0 to 12.0 parts by weight sulfonated glycerol trioleate;
(f) 2.0 to 4.0 parts by weight polyoxethylene tallow amine containing an average of 10-30 oxyethylene units per mole;
(g) 0 to 30 parts by weight of a silane having the structural formula

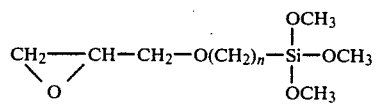

wherein n=2 to 5; and
(h) 3 to 15 weight percent, based on the non-aqueous portion, of paraffin wax.

16. The polyethylene teraphthalate filamentary yarn of claim 15 wherein the non-aqueous portion of said emulsion comprises 5 to 30 parts by weight gamma-glycidoxypropyltrimethoxysilane.

17. A method of producing polyester tire yarn to be processed into tire cord, said method comprising applying to drawn polyester yarn the finish composition of claim 1 in an amount sufficient to impart reduced resorcinolformaldehyde-latex wicking to said tire cord.

* * * * *